United States Patent [19]

Davis

[11] 4,415,044

[45] Nov. 15, 1983

[54] WEATHERPROOF TERMINAL COVER

[75] Inventor: Steven B. Davis, St. Mathews Township., Wake County, N.C.

[73] Assignee: Westinghouse Electric Corp., Pittsburgh, Pa.

[21] Appl. No.: 252,684

[22] Filed: Apr. 9, 1981

[51] Int. Cl.³ .................... H01R 13/44; H01R 13/52
[52] U.S. Cl. .................................. 174/138 F; 174/59; 339/44 M; 339/198 J
[58] Field of Search ............... 174/5 R, 59, 92, 138 F; 339/36, 44 R, 44 M, 116 R, 116 C, 198 J; 361/426

[56] References Cited

U.S. PATENT DOCUMENTS

| D. 203,828 | 2/1966 | Wells ........................... 174/138 F X |
| 3,155,770 | 11/1964 | Hollenden et al. ............. 174/153 R |
| 3,325,591 | 6/1967 | Wahl ................................. 174/92 X |
| 3,518,616 | 6/1970 | Lewis ........................... 174/138 F X |
| 4,195,194 | 3/1980 | Kuster et al. ........................ 174/59 |

OTHER PUBLICATIONS

Dix, W. A., "Connector Block Assembly", *Western Electric Technical Digest*, No. 44, Oct. 1976, pp. 19 and 20.

*Primary Examiner*—Laramie E. Askin
*Attorney, Agent, or Firm*—Robert E. Converse, Jr.

[57] ABSTRACT

A one-piece, molded, terminal cover providing a weatherproof enclosure externally of a field-mounted component is disclosed. A first member has a back face adapted for external connection to the field-mounted component. The back face has at least one opening communicating with an opening in the field-mounted component through which outgoing wires extend. The back face further has a continuous, external rib around the opening for providing a gasket. The first member additionally has a top face, a bottom face and two side faces. A second member has a front face, a top face, a bottom face and two side faces. The bottom face has at least one opening through which incoming wires extend. The first and second members are flexibly hinged and cooperate when in the closed position to define the weatherproof enclosure wherein the incoming and outgoing wires are connectable. Means are provided for locking the first and second members in the closed position.

8 Claims, 5 Drawing Figures

WEATHERPROOF TERMINAL COVER

BACKGROUND OF THE INVENTION

The present invention is related to weatherproof terminal covers generally, and more specifically, to one-piece, molded terminal covers.

In many situations field-mounted equipment is installed so as to be exposed to the elements. In certain of these situations, such as where the possibility of damaging the equipment is high or if the equipment is sealed so as to prevent unauthorized intrusion, it is desirable to have standard external terminals so that the equipment need not be opened for field wiring operations. Standard external terminals also eliminate the need for special tools and facilitate ease of field wiring. These external terminals require protection.

The external terminals and associated wiring connections require protection from the weather to eliminate corrosion and electrical shorting due to water. Providing a weatherproof enclosure also prevents inadvertent contact with the terminals as well as concealment of the terminals, which will discourage tampering.

It is also desirable to provide a gasket or seal to protect the interface between the weatherproof enclosure and the field-mounted component. This seal is necessary to prevent water from entering the field-mounted component.

SUMMARY OF THE INVENTION

The present invention is for a one-piece, molded terminal cover which provides a weatherproof enclosure for field wiring connections. A first member has a back face adapted for external connection to a field-mounted component. The back face has at least one opening communicating with the field-mounted component through which outgoing wires extend. The back face further has an external, continuous rib around the opening for providing a seal between the terminal cover and the field-mounted component. The first member also has a top face, a bottom face, and two side faces.

A second member has a front face, a top face, a bottom face, and two side faces. The bottom face has at least one opening through which incoming wires extend. The first and second members are flexibly connected and cooperate when in the closed position to define a weatherproof enclosure wherein the incoming and outgoing wires are connectable. Locking straps are provided for locking the first and second members in the closed position.

Because the terminal cover is an integral, one-piece, molded device, the user is assured of proper installation and operation in the field. This also eliminates the possibility of losing parts in the field.

Finally, since the terminal cover is molded, it is possible to mold the terminal cover with part numbers, terminal numbers, electrical classifications or codes, or other information desired by the user. This eliminates the need for individual marking or labeling devices.

DESCRIPTION OF THE PREFERRED EMBODIMENT

Figure 1:
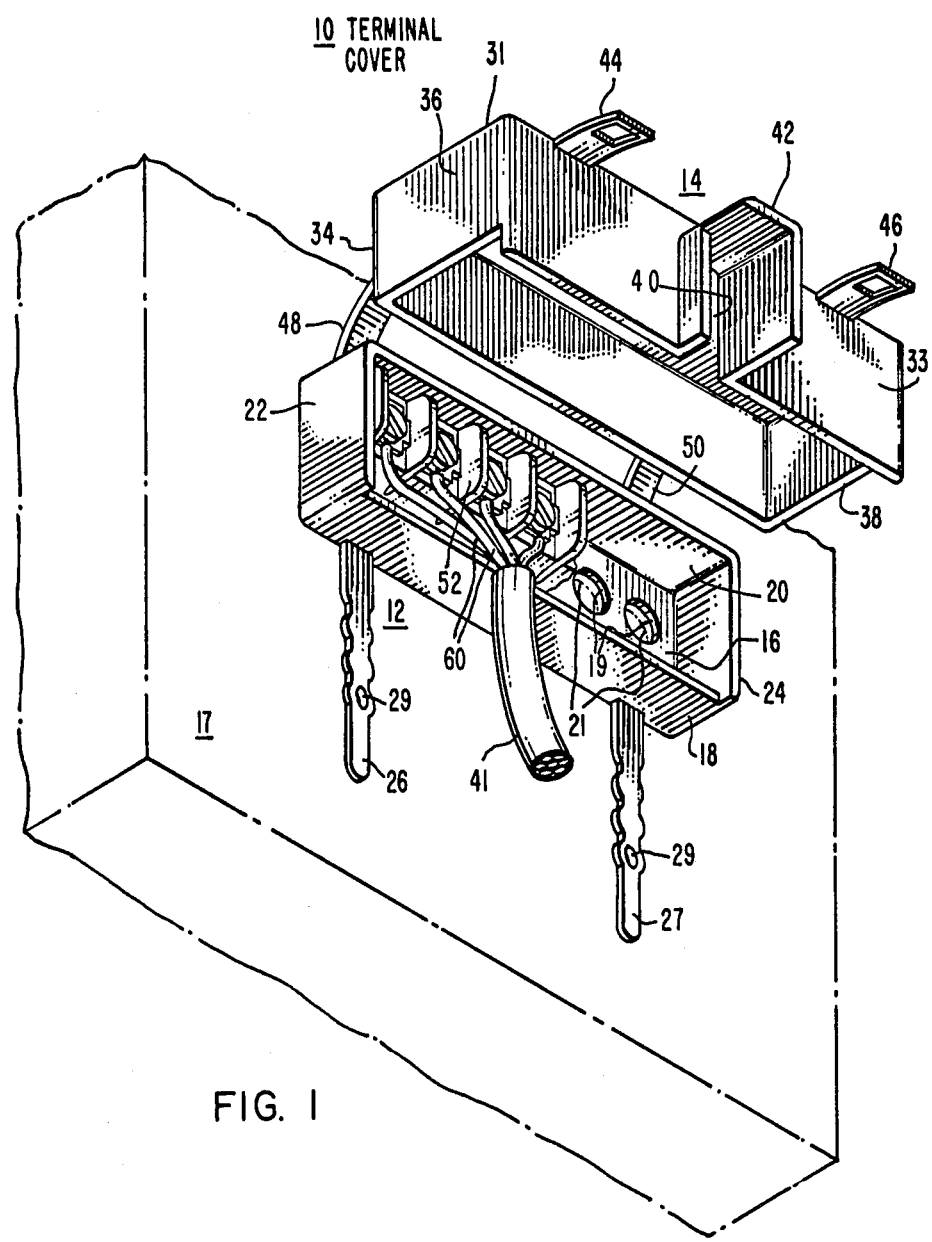
FIG. 1 is a perspective view illustrating a weatherproof terminal cover constructed according to the teachings of the present invention.

FIG. 1 is a perspective view illustrating a weatherproof, one-piece terminal cover 10 constructed according to the teachings of the present invention. The terminal cover 10 is shown in the partially open position in FIG. 1. The terminal cover 10 is comprised of a first, or bottom, member 12 and a second, or top, member 14. The bottom member 12 is comprised of a back face 16 adapted for external connection to a field-mounted component 17. The back face 16 has a plurality of openings 19 which communicate with a plurality of openings 21 in the field-mounted component 17. The openings 19 and 21 allow outgoing wires from the terminal cover 10 to enter the field mounted component 17. The back face 16 of the first member 12 is discussed in further detail in conjunction with FIGS. 4 and 5 hereinbelow.

The first member 12, in addition to the back face 16, has a bottom face 18, a top face 20, a first side face 22 and a second side face 24. The first member 12 additionally has a first locking strap 26 and a second locking strap 27. Each of the locking straps 26 and 27 has an opening 29.

The second member 14 has a front face 31, a bottom face 33, a top face 34, a first side face 36 and a second side face 38. The bottom face 33 of the second member 14 has an opening 40 through which an incoming cable 41 extends when the terminal cover 10 is in the closed position. A stress relief member 42 is carried by the bottom face 33 to provide stress relief for the incoming cable 41. The second member 14 additionally has a first receiving member 44 adapted for receiving the first locking strap 26 and a second receiving member 46 adapted for receiving the second locking strap 27.

The first member 12 and the second member 14 are flexibly connected by a first hinge strap 48 and a second hinge strap 50. The flexible hinge straps 48 and 50 allow the second member 14 to be moved from the fully open position shown in FIG. 2 to the fully closed position shown in FIG. 4, with FIG. 1 showing the second member 14 halfway between the fully open and the fully closed positions. The dimensions of the second member 14 are slightly larger than the dimensions of the first member 12 thus allowing the second member 14 to act as a cover for the first member 12 when in the closed position. The first member 12 and the second member 14 thus cooperate to define a weatherproof enclosure. A portion of a terminal block 52, which does not form an important part of the present invention, is shown in FIG. 1. The terminal block 52 is used to capture the back face 16 of the first member 12 against the external surface of the field-mounted component 17. In this manner, the terminal cover 10 is secured without the use of additional screws, bolts, or the like. The first and second members 12 and 14, and hinge straps 48 and 50 are constructed of molded thermoplastic rubber.

Figure 3:
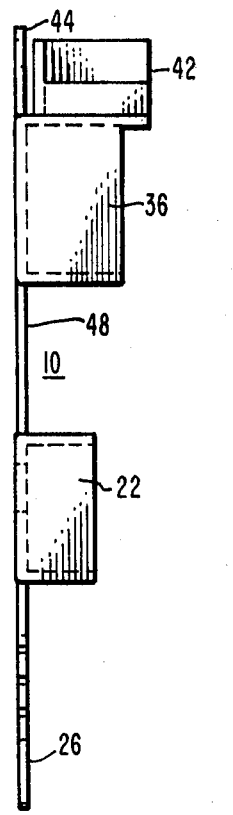
FIGS. 2 and 3 are front and side views, respectively, illustrating the present invention in the open position.
Figure 2:
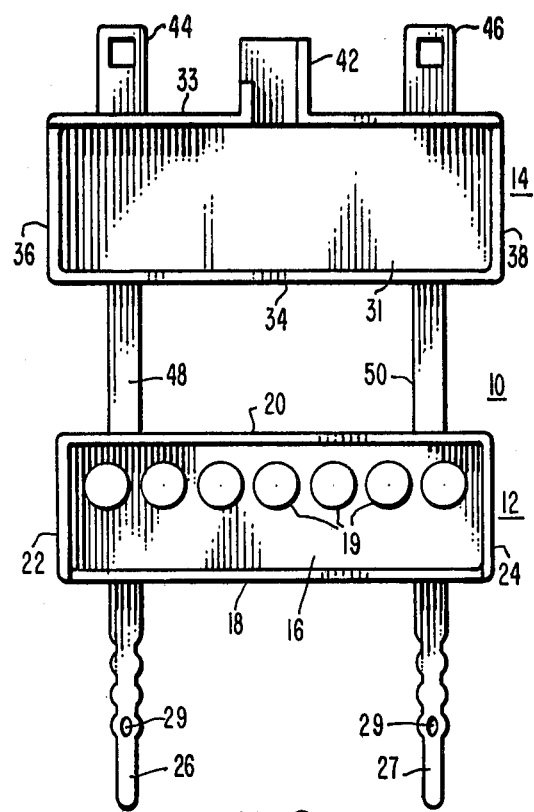

In FIGS. 2 and 3, a front view and a side view, respectively, of the terminal cover 10 in the open position are shown. Since the second member 14 is connected to the first member 12, the second member 14 will not be lost when field wiring connections are made. If desired, numbers may be molded on the inside of the back face 16 corresponding to the openings 19. Also, part numbers or labeling required by electrical codes may be molded onto an appropriate face of the terminal cover 10.

Figure 4:
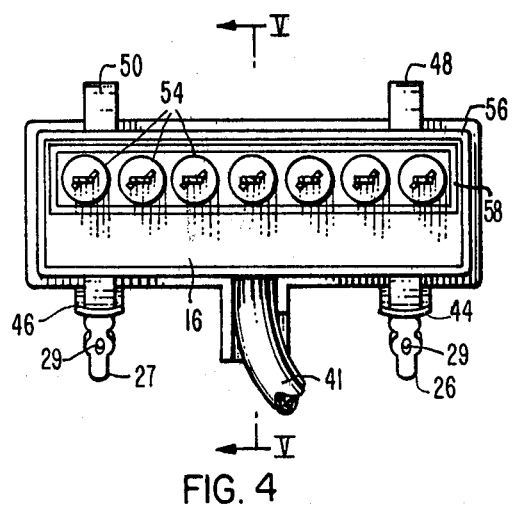
FIG. 4 is a back view illustrating the present invention in the closed position.

Turning to FIG. 4, a back view illustrating the terminal cover 10 in the closed position is shown. Individual terminals 54 of the terminal block 52 extend through the openings 19. The back face 16 of the first member 12 has a first continuous, raised portion 56, or rib, located about the periphery of the back face 16. A second continuous, raised portion 58, or rib, is located about the plurality of holes 19. The raised portions 56 and 58 provide a seal between the back face 16 of the terminal cover 10 and the field-mounted component 17. The raised portions 56 and 58 ensure a seal against an irregular surface and act as a gasket preventing water from flowing into the field-mounted component 17.

FIG. 4 also shows the mating relationship between the first locking strap 26 and the first receiving member 44 and the second locking strap 27 and the second receiving member 46. The locking straps 26 and 27 have an irregular width, thus allowing the locking straps to be held by the receiving members 44 and 46, respectively. The holes 29 in the locking straps 26 and 27 permit a meter seal, or the like, to be used to indicate tampering with the terminal cover. Finally, FIG. 4 shows the relationship between the stress relief member 42 and the incoming cable 41.

Figure 5:
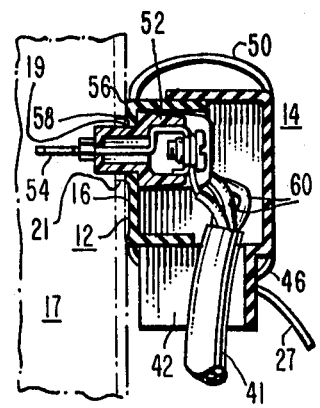
FIG. 5 is a cross-sectional view, taken along the line V—V in the direction of the arrows, illustrating the present invention in the closed position.

FIG. 5 is a cross-sectional view of the terminal cover of FIG. 4 taken along the line V—V. In FIG. 5, one of the terminals 54 of the terminal block 52 is shown extending through one of the openings 19 in the back face 16. FIG. 5 clearly illustrates the cooperation between the first member 12 and the second member 14 so as to provide a weatherproof enclosure. A plurality of conductors 60 carried within the cable 41 are fanned out within the weatherproof enclosure and connected to various terminals 54.

Briefly reviewing, a one-piece molded terminal cover which provides a weatherproof enclosure externally of a field-mounted component for connecting incoming and outgoing wires is disclosed. The terminal cover requires no screws or bolts for connection to the field-mounted component since the terminal cover is held in place by the terminal block. The terminal cover provides not only a weatherproof enclosure but a safety cover for the terminals. Labels or other identification may be molded into the terminal cover. The terminal cover also provides a gasket so as to prevent water from entering the field-mounted component and strain relief for the incoming cable. Since the terminal cover is a one-piece device, all of the above-enumerated advantages may be exploited without having to supply additional parts, or worry about parts being lost during field wiring connections. It is anticipated that modifications may be made to the embodiment described herein which fall within the scope and content of the present invention.

What is claimed is:

1. A one-piece terminal cover for providing a weatherproof enclosure externally of an associated field-mounted component for associated connectable incoming and outgoing conductors, said terminal cover comprising:

a first member having a back face adapted for external connection to an associated field-mounted component, a top face, a bottom face, and two side faces, said back face having at least one opening for communicating with an associated field-mounted component and for receiving therethrough associated outgoing conductors, said back face further having external raised portions around said opening for providing a gasket;

a second member having a front face, a top face, a bottom face, and two side faces, said bottom face having at least one opening for receiving therethrough associated incoming conductors;

means flexibly connecting said first and second members and for defining a closed position therebetween wherein said first and second members cooperate to define a weatherproof enclosure; and means for locking said first and second members in said closed position.

2. The terminal cover of claim 1 wherein said first member, said second member, said connecting means, and said locking means form a one-piece, molded component of thermoplastic rubber.

3. The terminal cover of claim 1 wherein said at least one opening comprises a plurality of openings for receiving a plurality of terminals of an associated terminal block.

4. The terminal cover of claim 1 wherein the external raised portions include an external continuous rib around the periphery of the back face and include an external continuous rib around said at least one back face opening, both of said ribs providing a gasket.

5. The terminal cover of claim 1 wherein the bottom face of the second member includes means for providing stress relief for associated incoming conductors.

6. The terminal cover of claim 1 wherein the means flexibly connecting said first and second members includes a first flexible strap connecting the first and second members and includes a second flexible strap connecting said first and second members.

7. The terminal cover of claim 1 wherein the means for locking includes a first and a second flexible strap both extending from the first member, and includes first and second means for receiving said first and second straps, said receiving means being connected to the second member.

8. The terminal cover of claim 7 wherein the first and second flexible straps include openings therethrough, said openings adapted for receiving sealing means for indicating when said terminal cover has been tampered with.

* * * * *